US007209461B2

(12) United States Patent
Agrawal et al.

(10) Patent No.: US 7,209,461 B2
(45) Date of Patent: Apr. 24, 2007

(54) METHOD AND APPARATUS FOR CHIP-RATE PROCESSING IN A CDMA SYSTEM

(75) Inventors: Avneesh Agrawal, San Jose, CA (US); Jeremy H. Lin, Fullerton, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/852,436

(22) Filed: May 9, 2001

(65) Prior Publication Data

US 2002/0167924 A1    Nov. 14, 2002

(51) Int. Cl.
*H04B 7/216*    (2006.01)
(52) U.S. Cl. .................. 370/335; 370/342; 370/441; 375/146; 375/147
(58) Field of Classification Search ................ 370/335, 370/342
See application file for complete search history.

(56) References Cited

U.S. PATENT DOCUMENTS

| 5,715,276 | A | * | 2/1998 | Tran et al. ................... 375/152 |
| 5,764,687 | A | * | 6/1998 | Easton ........................ 375/147 |
| 6,507,604 | B1 | * | 1/2003 | Kuo ............................ 375/148 |

| 2002/0064145 | A1 | * | 5/2002 | Khare et al. ................ 370/342 |
| 2002/0106008 | A1 | * | 8/2002 | Guey .......................... 375/148 |

FOREIGN PATENT DOCUMENTS

| WO | 9637968 | 11/1996 |
| WO | 0059123 | 10/2000 |
| WO | 0211309 | 7/2002 |

* cited by examiner

*Primary Examiner*—Chirag G. Shah
(74) *Attorney, Agent, or Firm*—Thomas Rouse; Chades D. Brown; George C. Pappas

(57) ABSTRACT

Techniques for increased finger demodulation capability in a hardware efficient manner are disclosed. In one aspect, I and Q samples are shifted into a parallel-accessible shift register. A plurality of chip samples are accessed from the shift register and operated on in parallel to produce a multi-chip result for a channel each cycle. These multi-chip results can be accumulated and output to a symbol-rate processor on symbol boundaries. The scheduling of shift register access, computation, and accumulation can be scheduled such that the hardware is time-shared to support a large number of channels. In another aspect, time-tracking of a large number of channels can be accommodated through channel-specific indexing of the contents of the shift register file. These aspects, along with various others also presented, provide for hardware efficient chip rate processing capability for a large number of channels, with a high degree of flexibility in deployment of those channels.

41 Claims, 7 Drawing Sheets

METHOD AND APPARATUS FOR CHIP-RATE PROCESSING IN A CDMA SYSTEM

BACKGROUND OF THE INVENTION

1. Field

The present invention relates generally to communications, and more specifically to a novel and improved method and apparatus for chip rate processing.

2. Background

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (5) some other standards. These standards are incorporated herein by reference. A system that implements the High Rate Packet Data specification of the cdma2000 standard is referred to herein as a high data rate (HDR) system. Proposed wireless systems also provide a combination of HDR and low data rate services (such as voice and fax services) using a single air interface.

Pseudorandom noise (PN) sequences are commonly used in CDMA systems for modulation of transmitted data, including transmitted pilot signals. CDMA receivers commonly employ RAKE receivers. A rake receiver is typically made up of one or more searchers for locating direct and multipath pilots from neighboring base stations, and two or more fingers for receiving and combining information signals from those base stations.

In general, the performance of any CDMA system is enhanced as more fingers are added to receivers in order to process a greater number of multipath signals from one or many base stations. This is particularly true as the chip rate used to spread incoming signals increases, as more components of the multipath signal are then distinguishable at the receiver. The W-CDMA standard describes such a system where the ability to demodulate a high number of signal components is desirable.

CDMA demodulators often include dedicated hardware, known as finger front ends, to process the relatively higher chip rate data that is received. Often a DSP or other processor is deployed to receive symbol rate data from the finger front end to further demodulate the symbols. One way to enhance the performance of any CDMA system, or to meet specifications for a higher chip rate system, is to replicate the hardware of one finger for as many fingers as are required. While this technique has been used with success in the past, as finger requirements grow, the resultant hardware requirements can become prohibitively expensive. An alternate technique is to provide a general purpose DSP capable of performing chip rate processing, although this too can be expensive in hardware and may require impractical clock rates and associated power drain to implement in a high speed system with a large number of channels to demodulate.

There is therefore a need in the art for a finger front end capable of processing a large number of channels delivered at high chip rate in a high throughput, hardware efficient manner.

SUMMARY OF THE INVENTION

Embodiments disclosed herein address the need for increased finger demodulation capability in a hardware efficient manner. In one aspect, I and Q samples are shifted into a parallel-accessible shift register. A plurality of chip samples are accessed from the shift register and operated on in parallel to produce a multi-chip result for a channel each cycle. These multi-chip results can be accumulated and output to a symbol-rate processor on symbol boundaries. The scheduling of shift register access, computation, and accumulation can be scheduled such that the hardware is time-shared to support a large number of channels. In another aspect, time-tracking of a large number of channels can be accommodated through channel-specific indexing of the contents of the shift register file. These aspects, along with various others also presented, provide for hardware efficient chip rate processing capability for a large number of channels, with a high degree of flexibility in deployment of those channels.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
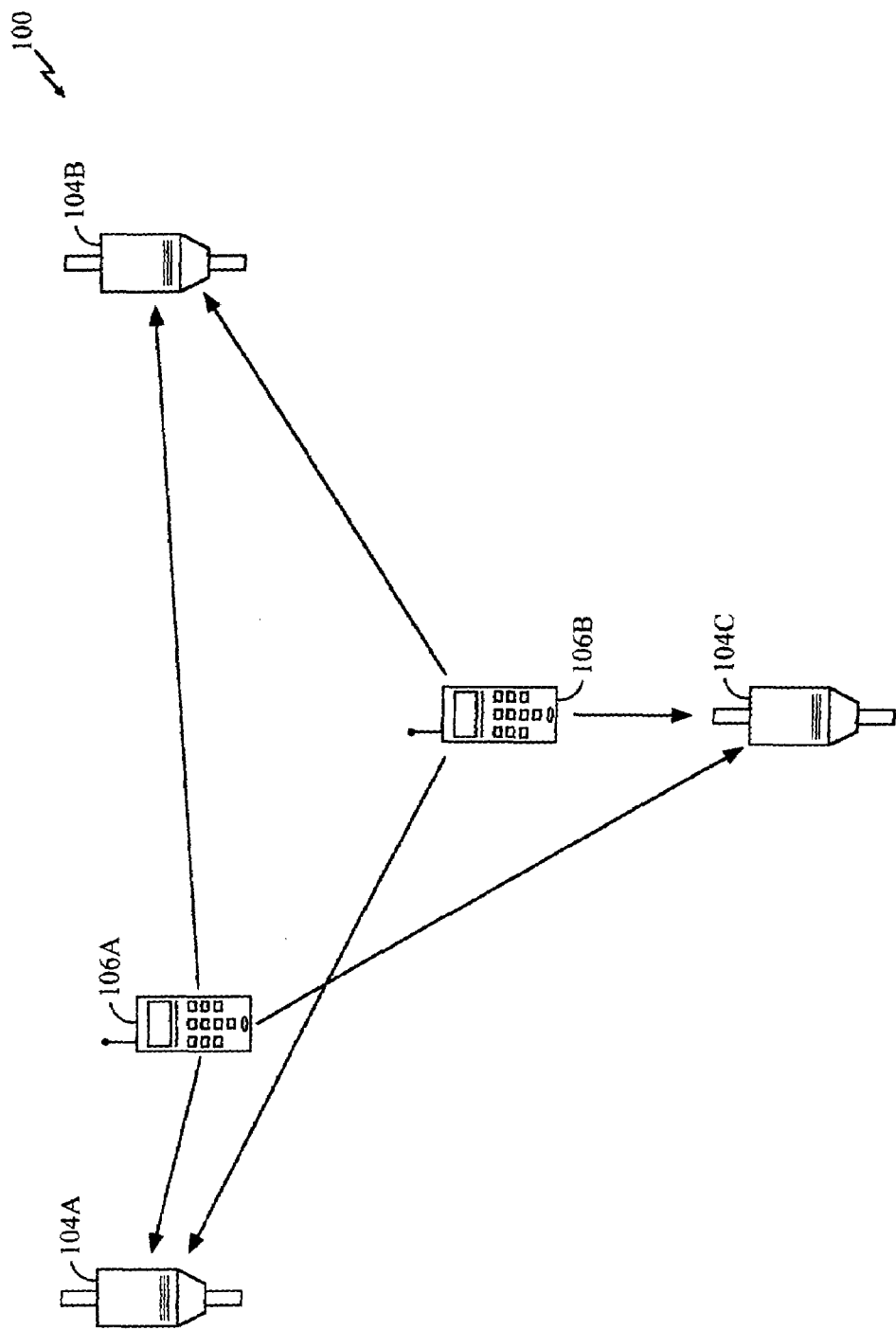
FIG. 1 is a wireless communication system that supports a number of users, and which can implement various aspects of the invention.

FIG. 1 is a diagram of a wireless communication system 100 that supports a number of users, and which can implement various aspects of the invention. System 100 may be designed to support one or more CDMA standards and/or designs (e.g., the IS-95 standard, the cdma2000 standard, the W-CDMA standard, the HDR specification). For simplicity, system 100 is shown to include three access points 104a, 104b, 104c (which may also be referred to as base stations) in communication with two access terminals 106a, 106b (which may also be referred to as remote terminals or mobile stations). An access point and its coverage area are often collectively referred to as a "cell".

Depending on the CDMA system being implemented, each access terminal 106a, 106b may communicate with one (or possibly more) access points 104a–104c on the forward link at any given moment, and may communicate with one or more access points on the reverse link depending on whether or not the access terminal is in soft handoff. The forward link (i.e., downlink) refers to transmission from the access point to the access terminal, and the reverse link (i.e., uplink) refers to transmission from the access terminal to the access point.

For clarity, the examples used in describing this invention will assume access points as the originator of pilot signals and access terminals as receivers and acquirers of those pilot signals, i.e. pilot signals on the forward link. Those skilled in the art would understand that access terminals as well as access points are can be equipped to transmit data with a pilot signal as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
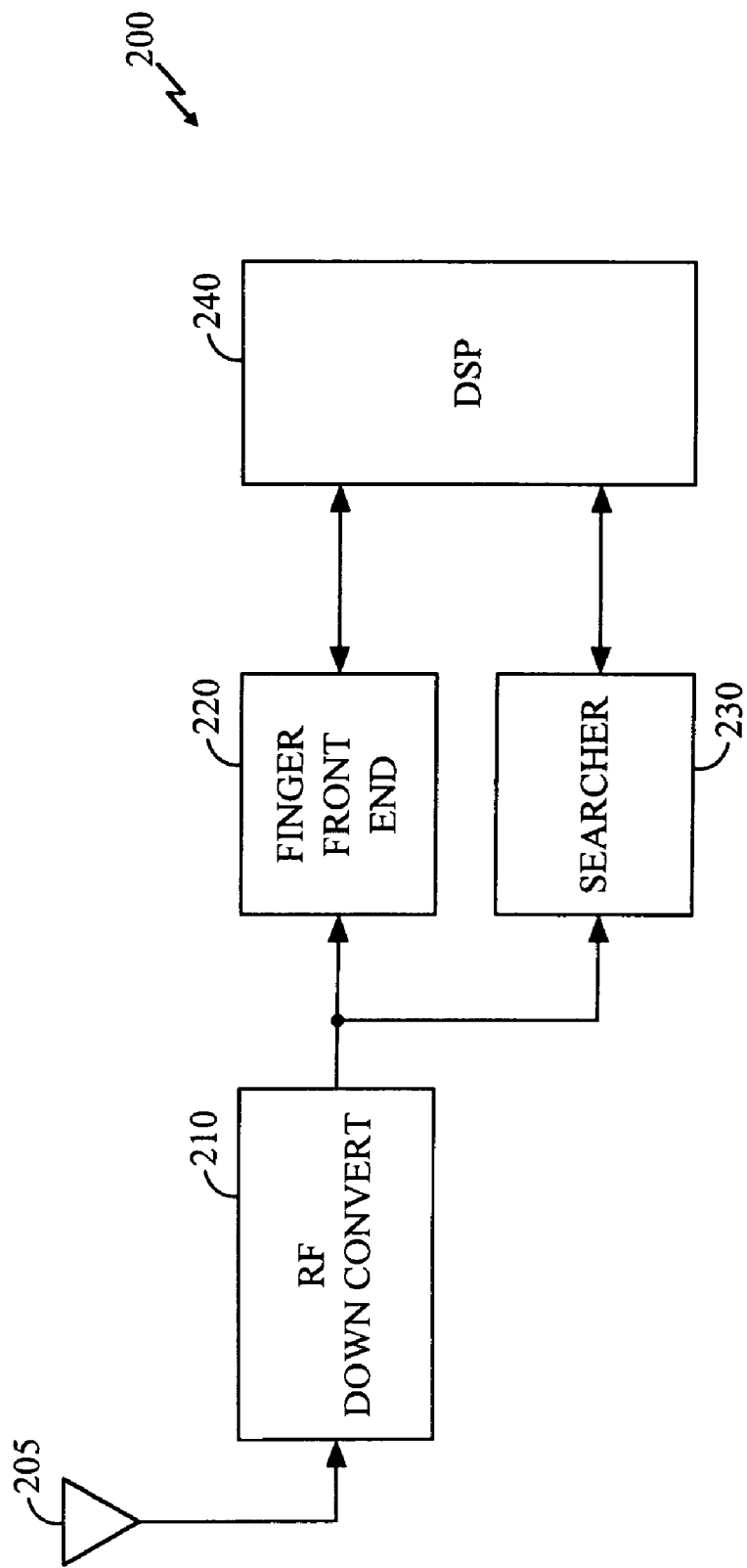
FIG. 2 depicts a CDMA receiver.

FIG. 2 depicts receiver 200. For clarity, only the components of the receiver involved in the following description of this embodiment are shown. Signals arrive at antenna 205 and are downconverted in RF downconvert 210. Resultant I and Q samples are delivered to finger front end 220 and searcher 230. Finger front end 220 and searcher 230 communicate with DSP 240. DSP 240 provides various control signals and control information to both finger front end 220 and searcher 230. Searcher 230 delivers pilot search results for various PN offsets, as directed by DSP 240, in accordance with one or more of the commonly known CDMA searching techniques. In response to those search results, DSP 240 determines whether and how to assign resources within finger front end 220 to the various signals, or channels, being received. The resources in finger front end 220 perform chip rate processing on those signals, and deliver demodulated symbol results to DSP 240. DSP 240 assigns each channel to one of the resources in finger front end 220 by delivering a PN offset to indicate which PN sequence to use in despreading the incoming I and Q samples. The offsets assigned typically come from searcher 230 and any subsequent processing in DSP 240, but alternate sources of offsets for finger assignment are known, such as signaling to identify nearby base stations, etc.

It is a common technique to dedicate specific hardware in a finger front end module to perform chip rate processing and to perform the relatively slower symbol rate processing in a DSP. Of course, those skilled in the art will recognize that the aspects of this invention apply with equal force if discrete hardware is deployed in lieu of DSP 240. Finger front ends typically are equipped to handle some number of channels or multipath signals simultaneously, and support for a greater number of channels provides increased performance. A common technique to increase channel support is to simply duplicate a single finger's hardware to provide support for as many fingers as desired. However, as the number of channels supported grows, the associated hardware can become prohibitively expensive. Finger front end 220 provides support for a large number of channels in a particularly hardware efficient manner.

Among the symbol rate processing tasks performed by DSP 240 are dot and cross product calculations of data with associated pilots. Finger front ends often provide, in addition to on-time symbol data, symbol data associated with earlier and later PN offsets. Finger front end 220 is highly configurable, and can be programmed to produce early and late symbol data in addition to on-time data. These early and late symbol data can be used by DSP 240 to perform time tracking, of which various techniques are known in the art. Based on a time tracking procedure, DSP 240 can direct any finger resource in finger front end 220 to advance or retard its timing. Symbol boundaries are determined in finger front end 220 for each channel according to a spreading factor assigned by DSP 240. Each spreading factor determines how many chips per symbol are being demodulated.

Similarly, techniques are known in the art for performing frequency error correction. Finger front ends can be configured with rotators to perform frequency error compensation. Finger front end 220 can be so equipped, and responds to phase information from DSP 240 to perform frequency error compensation.

Each channel in finger front end 220 can also be directed by DSP 240 to perform decovering according to an assigned covering sequence. One commonly employed group of covering sequences used in systems such as IS-95, cdma2000, and others, are Walsh codes. In the W-CDMA standard, a different set of covering sequences is employed called OVSF codes. The aspects of the present invention apply with equal force to systems employing Walsh codes and OVSF codes. In any example describing this invention, OVSF codes and OVSF generators can be replaced with Walsh codes and Walsh generators and the principles will still apply. Any conceivable covering code, in addition to Walsh and OVSF codes, is also supported by this invention.

Figure 3A:
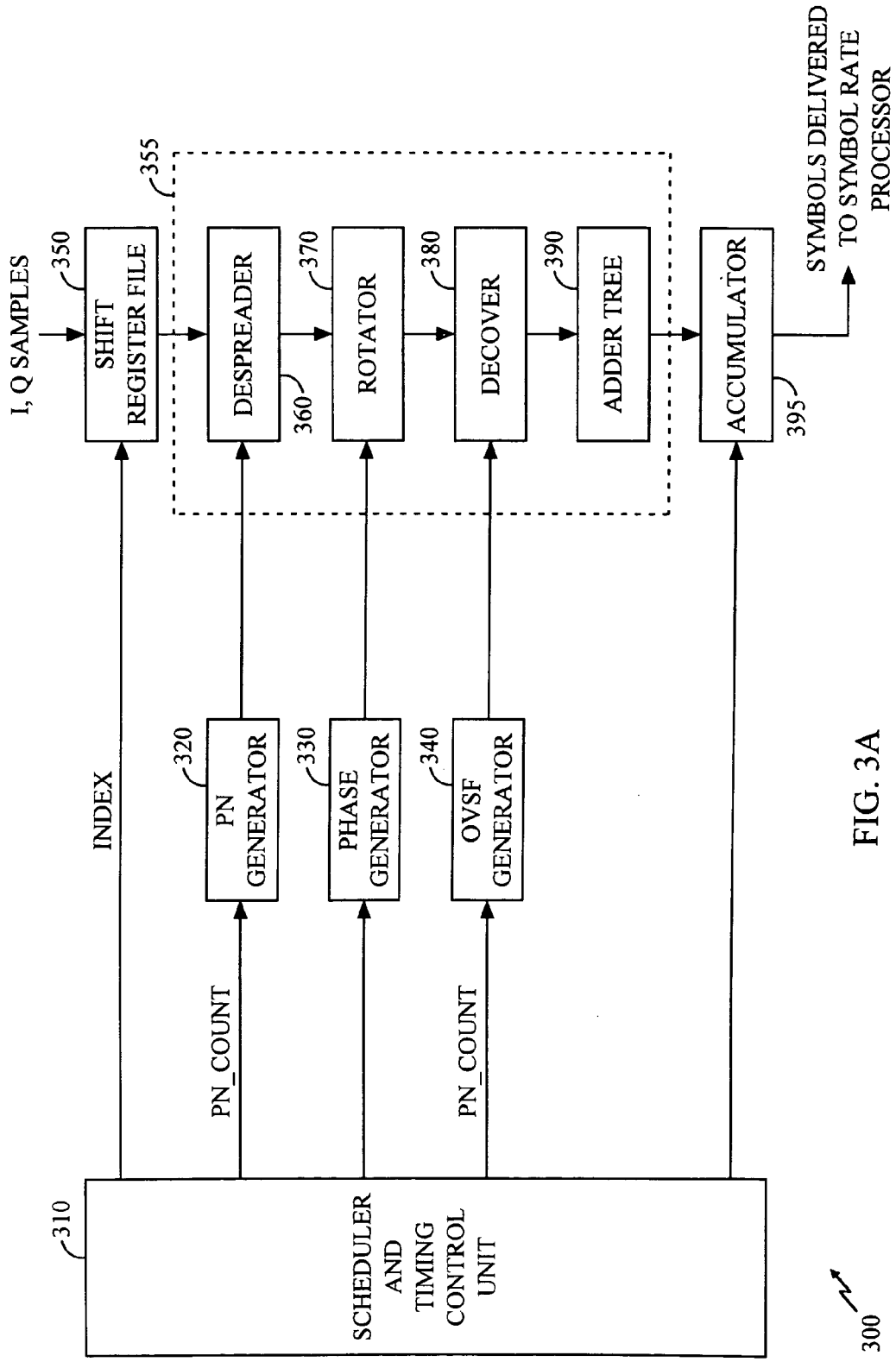
FIGS. 3A and 3B are two generalized embodiments of finger front end s configured in accordance with the present invention.

FIG. 3A depicts a more detailed embodiment, finger front end 300. Finger front end 300 is one embodiment that could be deployed as finger front end 220 shown in FIG. 2 above. Finger front end 300 provides a hardware architecture that combines time-sharing and parallelism to support demodulation of multiple channels simultaneously. An unlimited number of configurations can be implemented based upon a number of parameter values, described in detail below.

The number of channels that can be simultaneously demodulated with this architecture is defined as parameter MAX_CHANNELS. MAX_CHANNELS is a function of two other parameters, S and P. S is the sampling rate, the rate at which I and Q samples are delivered to shift register file 350 (explained further below). P is a parallelism factor, determined by the number of chips of I and Q data that are processed per cycle. With no time tracking, MAX_CHANNELS would be determined as P*S. However, with time tracking, MAX_CHANNELS is determined as (P*S)−2 to prevent overruns or underruns of shift register file 350.

In FIG. 3A, scheduler and timing control unit 310 (hereinafter scheduler 310) is shown connecting to the rest of the blocks in the figure either directly, or through another block. Scheduler 310 provides timing control for the various blocks as they are used to process the number of channels determined by MAX_CHANNELS. Each channel is processed sequentially, one channel per cycle, where a cycle is defined by the sampling rate. One common sampling rate employed in CDMA systems is 8 times the chip rate, commonly known as chip×8. Any sampling rate is supported by the current invention, however. During each cycle, the channel that is being processed is called the active channel. A round is defined as the processing of each channel once, in succession. The number of cycles needed to complete a round, CYCLES_PER_ROUND, is determined as MAX_CHANNELS+1. This is so because each channel, of which there are MAX_CHANNELS, requires one cycle for computation, and an additional spare cycle is needed to allow time tracking to take place. The details of time tracking will be given with respect to the flowchart in FIG. 4 below.

I and Q samples are shifted into and stored in shift register file 350 at the sampling rate of S samples per chip. The data stored is addressable via an address labeled index in FIG. 3A, shown as an output from scheduler 310. Each cycle, the index provided to shift register file 350 corresponds to the currently active channel. For each access based on index, P pairs of I and Q data are retrieved from shift register file 350. This allows P chips, of I and Q data, to be demodulated simultaneously. The pairs retrieved are spaced S samples apart, as appropriate since P chips of data are desired. Maintaining S samples per chip in shift register file 350 allows time tracking to be performed via simple updating of the address given as index, and allows early, late, or other data to be demodulated as well. The length of shift register file 350 must be sufficient to hold P chips worth of data, plus an additional amount of storage to buffer the data until it is used in a round without being shifted out and lost prematurely. The shifter length required, SHIFTER_LEN, can be determined as CYCLES_PER_ROUND+(P−1)S.

Despreader 360, rotator 370, decover 380, and adder tree 390 make up block 355 which is referred to herein as a parallel sum. The P pairs of I and Q values from shift register file 350 are delivered to despreader 360, which contains P parallel despreaders for despreading them with P pairs of I and Q PN values delivered from PN generator 320. Despreading techniques are commonly known in the art. The P resultant despread I and Q pairs are delivered to rotator 370, where the I and Q pairs are rotated in P rotators according to the P outputs of phase generator 330. In the illustrative embodiment, the despread, rotated pairs are delivered to decover 380, where P OVSF codes are delivered from OVSF generator 340 to decover them. The decovered I values are then summed in adder tree 390 to produce a P chip I sum, and the decovered Q values are similarly summed in adder tree 390 to produce a P chip Q sum. The result of calculating a single I,Q result from P I,Q pairs is called a parallel sum. The parallel sum is calculated once per cycle, each cycle for one channel, until every channel is successively calculated. During idle cycles, a parallel sum need not be calculated, or the output of parallel sum 355 can simply be ignored. Rotators are optional—instead of frequency adjusting each signal independently, an overall frequency adjustment can be calculated and compensated for in clock generation circuitry (not shown). The present invention can be practiced in an alternate embodiment utilizing neither phase generator 330 nor rotator 370.

The parallel sum 355 output is delivered to accumulator 395 where it is added to a partial accumulation value corresponding to the active channel accessed in accumulator 395 (there is a separate accumulation for both the I and the Q for each active channel). Unless a symbol boundary has been reached, the new partial accumulation is stored in accumulator 395 in a location corresponding to the active channel. When a symbol boundary has been reached, the number of chips designated by the spreading factor, SF, for the active channel, have been accumulated in the partial sum. In this case, the I and Q accumulations correspond to the energy in the symbols and are delivered to the symbol rate processor. In the example of FIG. 2, the symbol rate processor is DSP 240, but, as discussed above, other types of symbol rate processors are known and may be implemented as well. The partial accumulation values then stored in accumulator 395 for the active channel will be reset to zero. The signaling to accumulator 395, which dictates whether the accumulation is to be output and then reset or to simply accumulate, comes from scheduler 310. Scheduler 310 maintains a spreading factor (SF) value for each channel and determines when the symbol boundary has been reached.

In some configurations, the spreading factors allowed may be smaller than the parallelism factor P. Under circumstances where an SF<P is programmed for an active channel, the adder tree will, without modification, produce a result that adds more than one symbol's worth of chips. In these configurations, the adder tree may be tapped at as many earlier stages prior to the final adder tree output as is appropriate to facilitate producing multiple symbols per cycle. These prior taps can be multiplexed with the accumulator output to allow for the entire available range of spreading factors to be utilized. A more specific example of this aspect will be detailed below in relation to FIG. 5.

PN generator 320 produces P pairs of I and Q PN data each cycle based on a value pn_count delivered from scheduler 310. There are a variety of types of PN sequences. For example, in IS-95 systems a single I and a single Q PN sequence which can be generated from linear feedback shift registers are used for spreading and despreading, with base stations identifying themselves via unique offsets in those PN sequences. On the other hand, in W-CDMA systems, the PN sequences are generated using Gold codes, and each base station identifies itself using a unique code. The aspects of this invention apply regardless of which type of PN sequence is used, or how PN generator 320 is implemented. Scheduler 310 keeps a PN count for each channel and provides the PN count for the active channel, denoted $pn_{count}$ in FIG. 3A, to PN generator 320 for calculating the appropriate P pairs of I and Q PN values for despreading in despreader 360. Examples of PN generators useful in this context would include ROM based look up tables, indexed on pn_count, or one of the variety of masking schemes known in the art.

Phase generator 330 can be used in several ways. A rotator is essentially a complex multiplier that multiplies the incoming I and Q pair by a unit vector with a certain phase. One implementation of phase generator 330 is a RAM coupled with an adder. The RAM contains a phase accumulation for each channel. Each cycle, a channel's phase accumulation can be delivered to rotator 370 for rotation, then a phase can be added to the accumulation and the result stored back in the active channel's RAM memory location. The phase can be provided on a channel-by-channel basis from scheduler 310. One approach to implementation of the parallel rotator is as follows. Define phase to be the accumulated phase for the active channel. Define $\Delta$ to be the amount of phase adjustment per chip required for frequency compensation. ($\Delta$ can be supplied per channel from a DSP such as DSP 240). For each cycle, provide phase, phase+$\Delta$, phase+$2\Delta$, phase+$3\Delta$, . . . , phase+$(P-1)\Delta$ to the P rotators in rotator 370. This method accounts for the fact that each of the P chips being processed are delayed by a chip from each other. After rotation, replace phase for that channel in the RAM with phase+$P*\Delta$, and phase will be ready for that channel during the next round. In an alternative embodiment, for coarser frequency adjustment, a single phase can be used for the P rotators in rotator 370, thus trading off accuracy for complexity and hardware. As mentioned before, rotators are not required in CDMA finger front end processing blocks. There are alternative methods known in the art for performing frequency compensation.

OVSF generator 340 produces OVSF codes based on pn_count of the active channel as well. Well known in the art are techniques for taking the lower bits of pn_count and generating the appropriate Walsh or OVSF codes from them. One example, perhaps useful given the need to generate P values simultaneously, is a ROM based lookup table. Also known are XOR trees (requiring generally $\log_2(SF)$ XORs.

Those skilled in the art will recognize that these descriptions delineate blocks based on functionality for descriptive purposes only. One could redraw FIG. 3A with PN generator 320, phase generator 330, and OVSF generator 340 subsumed into either the blocks that receive their respective outputs or into scheduler 310.

Figure 3B:
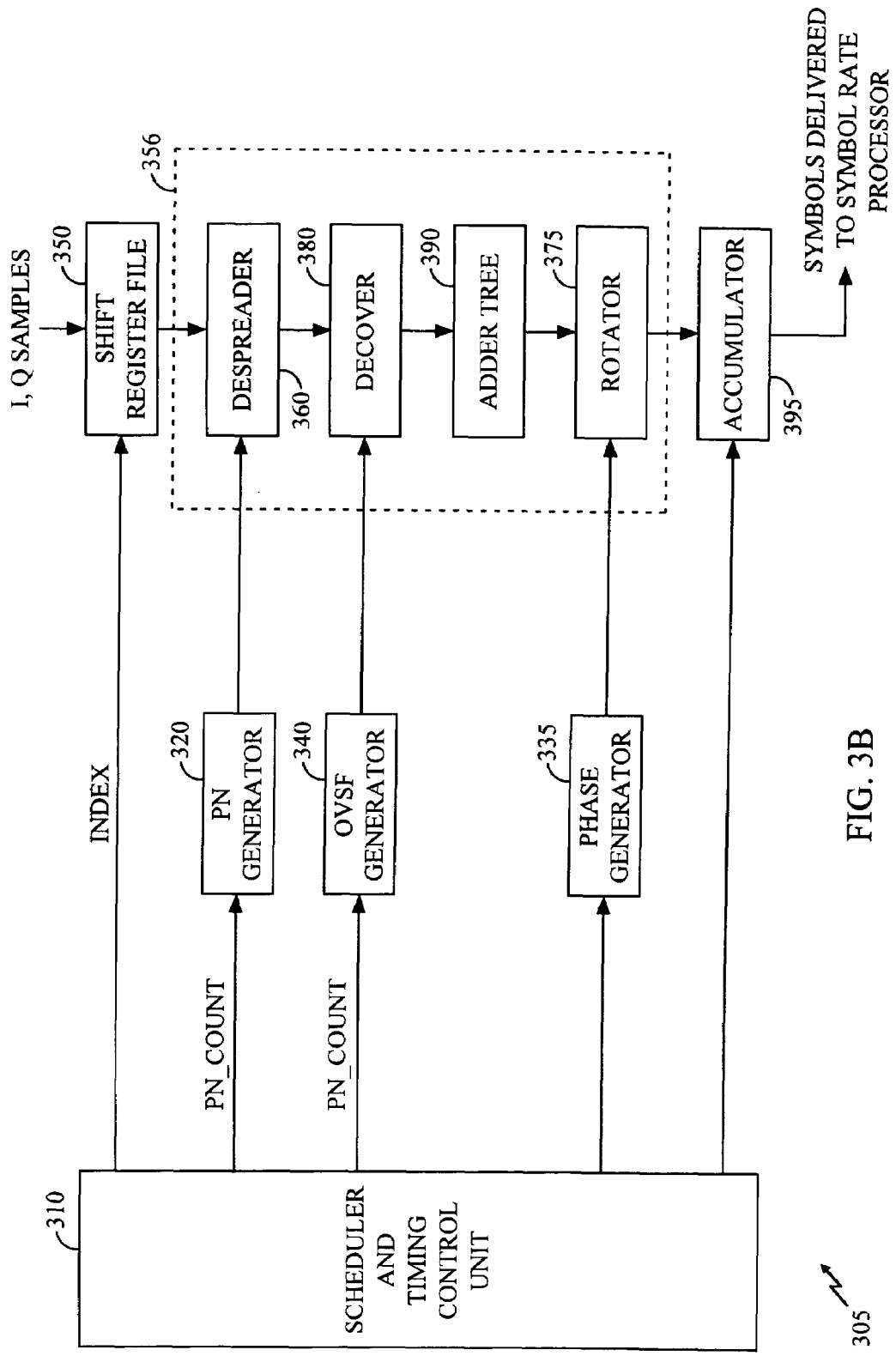

FIG. 3B depicts an alternate embodiment, finger front end 305. The discussion relating to FIG. 3A holds in its entirety for this figure, except with respect to the location of the rotator. Blocks that remain identical between the two figures are given like numbers in each figure. Scheduler 310 continues to drive shift register file 350, PN generator 320, OVSF generator 340, and accumulator 395. I and Q samples continue to arrive at shift register file 350. PN generator 320 and OVSF generator 340 drive despreader 360 and decover 380, respectively. The change is made within parallel sum 356, which differs from parallel sum 355 of FIG. 3A. In FIG. 3A, rotator 370 was placed between despreader 360 and decover 380. As such, it fell within the area of the circuit where P rotators were required to process the results of parallel sum 355. In FIG. 3B, the rotator, now numbered 375, is placed after the adder tree. Despreader 360 results are passed directly to decover 380, then to adder tree 390, and finally into rotator 375. The benefit of placing rotator 375 after the adder tree is that only a single rotator is necessary, not P as in FIG. 3A. Scheduler 310 drives phase generator 335, which is designated differently than phase generator 330 since it only requires a single phase value per channel to be stored. This configuration provides an averaging effect that is less accurate than the chip-by-chip rotation of FIG. 3A, but may prove useful when hardware complexity is at a premium and this type of frequency compensation is sufficient.

As discussed above, the present invention provides a hardware efficient solution for providing support for demodulating a large number of channels simultaneously (MAX_CHANNELS, to be precise). The manner in which the support is provided also provides great flexibility for how the resources are allocated. For example, in prior art finger front ends which duplicated one finger's hardware M number of times, the ability to trade off resources was limited. Such a configuration would typically produce early, late and on-time data for M pilots and M data streams. As such, essentially 4M channels would be deployed, but a maximum of M data streams would result. In the present invention, the DSP is free to allocate the channel resources in a variety of ways. Like the older hardware versions, one option is to demodulate one pilot, a corresponding data signal, and an early and late stream for time tracking. In addition, however, a single pilot can be demodulated with a larger number of corresponding data streams, and only one early and late stream to provide time tracking. This is useful when the transmitted signal bundles more than one data stream with unique codes and transmits them all with a common pilot.

Figure 4:
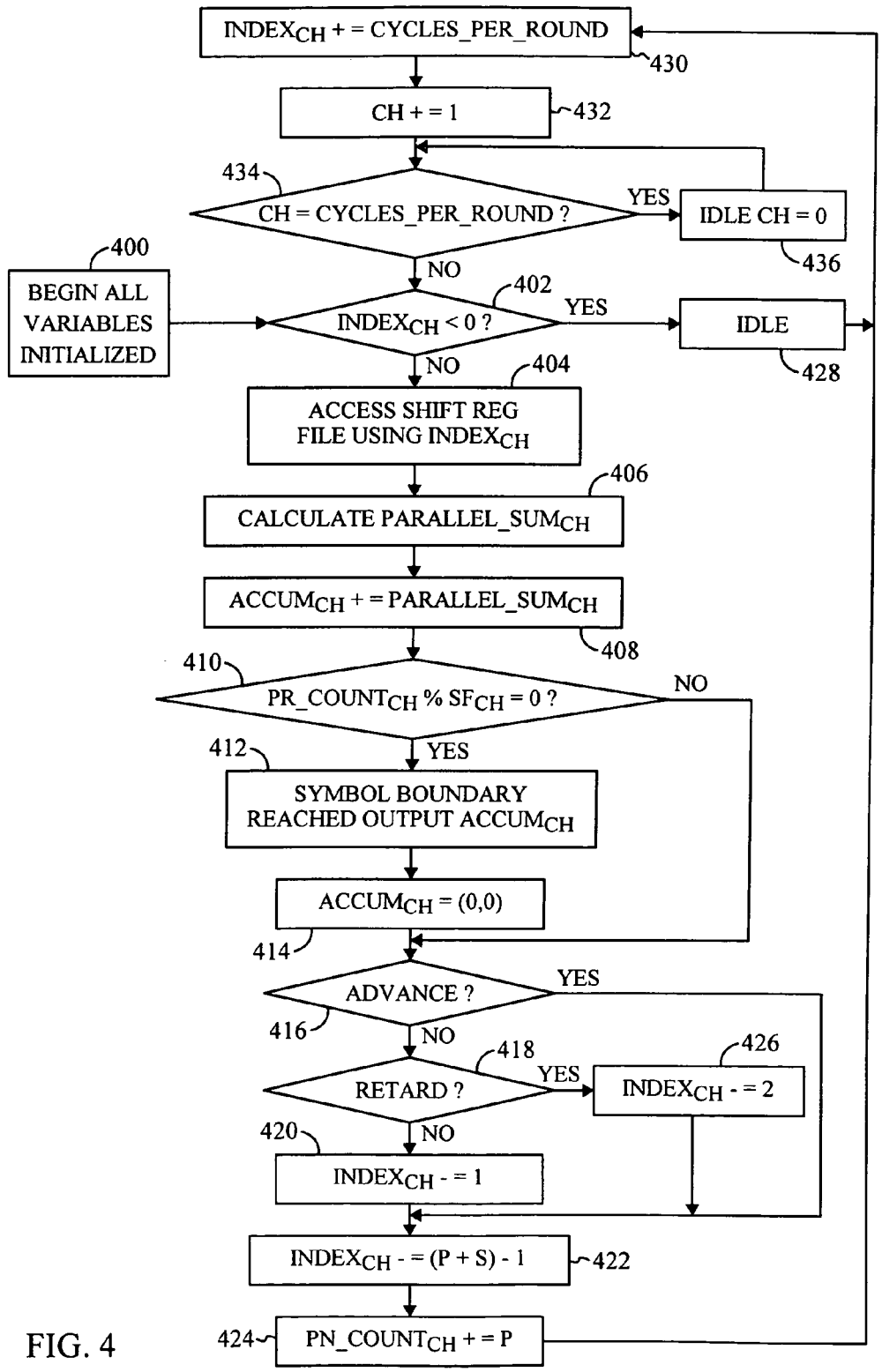
FIG. 4 is a flow chart detailing sequencing and time-tracking functions.

FIG. 4 is a flowchart detailing how a scheduler, such as scheduler 310, can perform proper indexing, symbol boundary detection, and time tracking. Note that the subscript CH on a variable indicates that each individual channel has a unique variable of that name, and use of the variable indicates it is the variable corresponding to the active channel (contained in variable CH).

The flowchart operates as follows. Begin in block 400. For discussion, it is assumed that the active channel, CH, is initialized to zero, and all variables are initialized. In general, a DSP, such as DSP 240, is free to allocate a new channel by supplying the variables defining it. These include a spreading factor (SF), a PN offset (PN_OFFSET) to identify the PN sequence (either an offset in a common sequence or a unique sequence), and a covering code for that channel (OVSF_CODE). Note that, typically, pilot channels are not covered, so an all zeros OVSF_CODE can be assigned in those cases. The updating of variables for a particular channel is not shown in FIG. 4. The assumption is that the DSP is free to update channel parameters at will, and that appropriate safeguards will be taken to avoid overwriting a channel variable while it is active.

The distinction between an early or late channel is not of importance within this finger front end. The DSP can simply assign the time tracking channels by using the appropriate shift in the PN sequence and use the resultant symbols to perform time-track processing. All channels are treated uniformly by the finger front end.

Returning to the flowchart, from 400 proceed to 402. Check if $index_{CH} < 0$. The variable, index, is used generally as the address of the shift register file, where the most recent samples are stored in location 0 and the oldest remain in location (SHIFTER_LEN−1). Index values of less than 0 are not valid addresses, so this is used to determine when to enter an idle state. These correspond to retard commands when the index previously pointed to location 0 or 1 in the shift register file, or on-time processing when the index pointed to 0. If $index_{CH} < 0$, proceed to 428, remain idle (update nothing, output nothing), then proceed to 430. In 430, increment $index_{CH}$ by CYCLES_PER_ROUND. The cycle is finished. Proceed to 432 and increment CH by one to process the next channel.

From 432 proceed to 434 to check if CH=CYCLES_PER_ROUND. If so, then the round is over since CYCLES_PER_ROUND has been reached from a starting value of zero. Proceed to 436, remain idle (do no channel processing), and reset CH to zero. Proceed back to 434 where CH will not equal CYCLES_PER_ROUND since it has just been reset. Proceed back to 402 to check if $index_{CH} < 0$, as discussed above.

If $index_{CH}$ is not less than zero, channel processing will commence. Proceed to 404 and access the shift register file using $index_{CH}$. Proceed to 406 and calculate $parallel\_sum_{CH}$ (as described previously with respect to FIGS. 3A and 3B, and detailed in flow chart form in FIGS. 4A and 4B below). Proceed to 408 and accumulate $parallel\_sum_{CH}$ by adding $parallel\_sum_{CH}$ to $accum_{CH}$. Proceed to 410.

In 410, check if a symbol boundary for this channel has been reached. One method is to test if $pn\_count_{CH}$ % $SF_{CH}=0$, where $pn\_count_{CH}$ is the current PN location for the active channel and $SF_{CH}$ is its spreading factor. If not, proceed to 416. If so, a symbol boundary has been reached. Proceed to 412 and output $accum_{CH}$. Proceed to 414 and reset $accum_{CH}$ to zero. Note that block 414 depicts the reset value as (0,0). This is to indicate that the accumulator is accumulating both an I and a Q value, so both need to be reset to zero. Proceed to 416.

In 416, check if an advance command has been given to this channel. If so, proceed to 422. If not, proceed to 418 to check if a retard command has been given. If so, proceed to 426 and decrement $index_{CH}$ by two. Then proceed to 422. If a retard command was not issued, proceed to 420. In 420, decrement $index_{CH}$ by one. Decrementing by one is the action taken when neither an advance nor a retard command is given. A retard causes an extra decrement to occur. An advance removes the decrement. Blocks 416, 418, 420, and 426 are the time-tracking blocks. As stated, when finished with an advance, retard, or on-time adjustment to $index_{CH}$, proceed to 422.

In 422, decrement $index_{CH}$ by (P*S)−1. Proceed to 424 and update $pn\_count_{CH}$ by incrementing by P. This is because P chips are processed each cycle. Proceed to 430, where, as described above, $index_{CH}$ is incremented by CYCLES_PER_ROUND. Then, in block 432, CH is incremented by one and the process repeats for the next channel in the round.

It will be clear to skilled artisans that some of the increment and decrement steps just described will collapse into fewer steps when the fixed parameters are set, as they will be in any particular implementation. The sequence of steps remains general and applies for any combination of P and S (from which the other parameters are derived).

A detail that is not shown is the treatment of non-assigned channels in this process. Regardless of whether or not all the channels are assigned and active, to maintain the proper timing, all channels plus the idle state are cycled through each round. There are a variety of ways to handle unassigned channels. A power efficient method would be to leave all the signals that ultimately cause computation in the parallel sum to remain unchanged, and thus excess toggling of the hardware is reduced. Similarly, the accumulator can be disabled when processing an unassigned channel. The accumulator output can be turned off for an unassigned channel. Or, the DSP (or other symbol rate processor) can simply ignore results generated for unassigned channels.

Figure 4A:
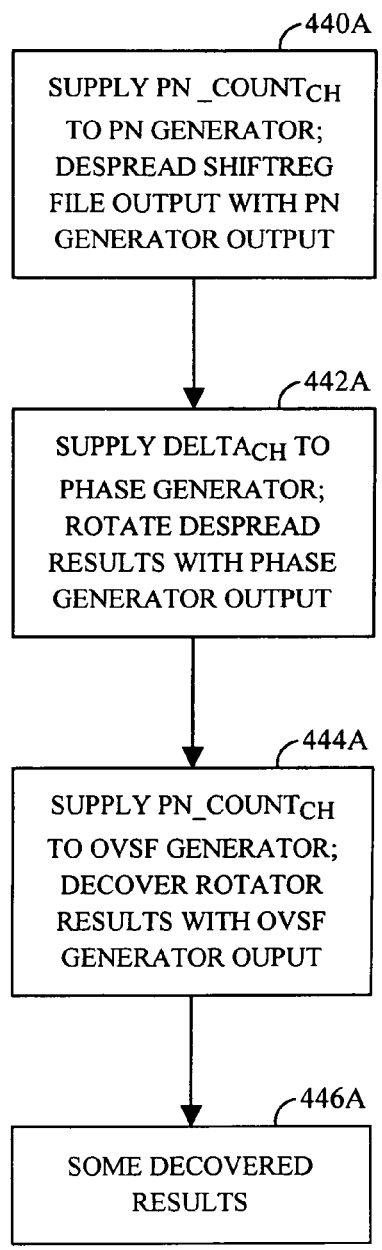
FIGS. 4A and 4B are flow charts providing additional detail for two embodiments.

FIG. 4A depicts a detailed embodiment of step 406, calculating the parallel sum. This procedure corresponds to the apparatus depicted in FIG. 3A above. In 440A, supply $pn\_count_{CH}$ to the PN generator. Despread the output of the shift register file with the output of the PN generator. Proceed to 442A. Supply $delta_{CH}$ to the phase generator. Rotate despread results with phase generator output. As in FIG. 3A, this rotator requires P rotation computations or elements. Proceed to 444A. Supply $pn\_count_{CH}$ to OVSF generator. Decover the rotator results with OVSF generator output. Proceed to 446A and sum the decovered results.

Figure 4B:
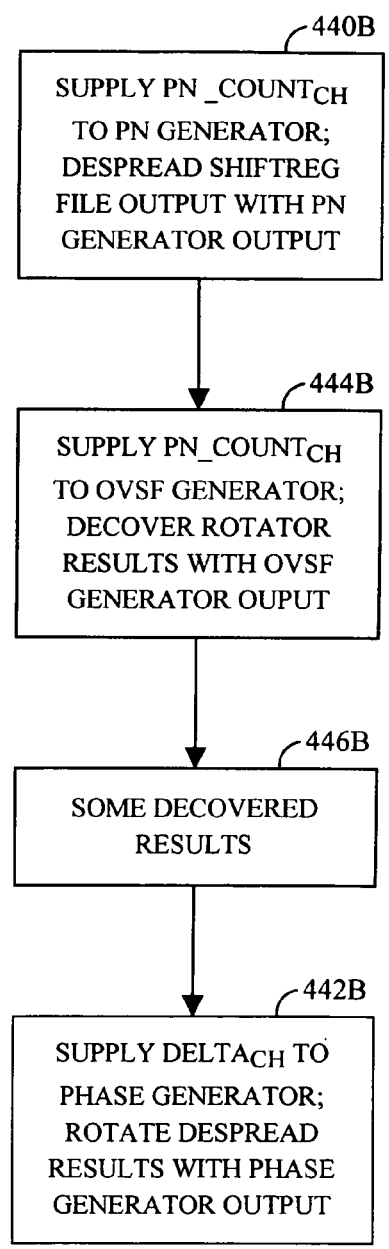

FIG. 4B depicts an alternative embodiment of step 406, calculating the parallel sum. As in FIG. 3B, placing the rotator at the end of the process instead of between despreading and decovering lowers the rotation computations or elements from P to one. In 440B, supply $pn\_count_{CH}$ to the PN generator. Despread the output of the shift register file with the output of the PN generator. Proceed to 444B. Supply $pn\_count_{CH}$ to OVSF generator. Decover the despread results with OVSF generator output. Proceed to 446B and sum the decovered results. Proceed to 442A. Supply $delta_{CH}$ to the phase generator. Rotate summed results with phase generator output. As in FIG. 3B, this rotator requires only one rotation computation or element.

Figure 5:
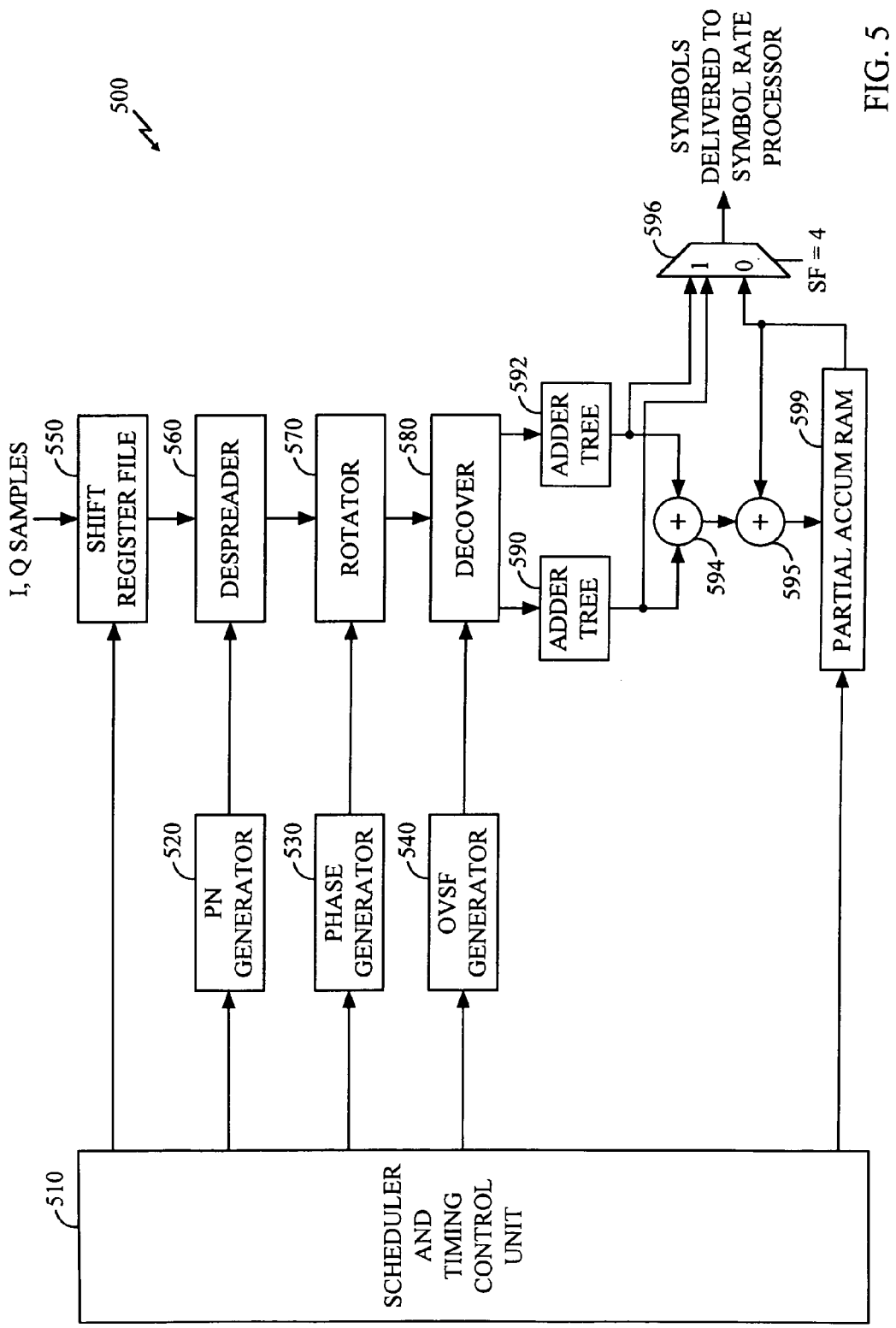
FIG. 5 is a block diagram of a finger front end with parameters specified, demonstrating various aspects of the present invention.

FIG. 5 depicts an alternate embodiment labeled finger front end 500. Finger front end 500 is one embodiment that could be deployed as finger front end 220, described with respect to FIG. 2 above. Actual parameters will be chosen for this example, and the principle of handling spreading factors less than parallelism P will be further detailed through this example. A common sampling rate in CDMA receivers is at chip×8, and in this example S is set to 8. The level of parallelism supported, P, will also be set to 8. Hence, MAX_CHANNELS=P*S−2=62. CYCLES_PER_ROUND=MAX_CHANNELS+1=63. SHIFTER_LEN=CYCLES_PER_ROUND+(P−1)S=119. In this example, spreading factors as low as 4 are supported, as well as 8 and higher integer multiples of 8.

In FIG. 5, I and Q samples are shifted into and stored in shift register file 350 at the sampling rate of S samples per chip. The data stored is addressable via an address labeled index, shown as an output from scheduler and timing control unit 510 (hereinafter scheduler 510). Each cycle, the index provided to shift register file 550 corresponds to the currently active channel. For each access based on index, 8 pairs of I and Q data are retrieved from shift register file 550. This allows 8 chips of I and Q data to be demodulated simultaneously. The pairs retrieved are spaced 8 samples apart, as appropriate since 8 chips of data are desired.

The 8 pairs of I and Q values from shift register file 550 are delivered to despreader 560, which contains 8 parallel despreaders for despreading the 8 pairs of I and Q data with 8 pairs of I and Q PN values delivered from PN generator 520. The 8 resultant despread I and Q pairs are delivered to rotator 570, where they are rotated in 8 rotators according to the 8 outputs of phase generator 530. The despread, rotated pairs are delivered to decover 580, where 8 OVSF codes are delivered from OVSF generator 840 to decover them. The first 4 of the 8 decovered I values are then summed in adder tree 590 to produce a 4 chip I sum, and the first 4 of the 8 decovered Q values are similarly summed in adder tree 590 to produce a 4 chip Q sum. The second 4 of the 8 decovered I values are summed in adder tree 592 to produce a second 4 chip I sum, and the second 4 of the 8 decovered Q values are similarly summed in adder tree 592 to produce a second 4 chip Q sum.

The resultant first and second 4 chip I and Q sums from adder trees 590 and 592, respectively, are delivered to final adder stage 594 to produce an 8 chip I sum and an 8 chip Q sum. The first and second 4 chip I and Q sums from adder trees 590 and 592, respectively, are also delivered to multiplexor 596. When the spreading factor (SF) of the active channel is 4, there are two symbols completed during the single chip×8 cycle. Multiplexor 596 is directed by scheduler 510 to deliver the two symbols of I and Q data to the symbol rate processor (not shown).

The output of final adder stage 594 is added in adder 598 with partial accumulation for the active channel stored in partial accum RAM 599. Final adder stage 598 and partial accum RAM make up the accumulator function, which is controlled by scheduler 510 to output the results through multiplexor 596 for delivery to the symbol rate processor at symbol boundaries. For SF not equal to 4, the output of partial accum RAM is selected in multiplexor 596. Scheduler 510 also controls the resetting of the active channel partial accumulation value. Naturally, when SF=8, there is no actual accumulation needed since an 8 chip result is calculated in final adder stage 598. When SF=8 the partial accumulation is constantly set to zero and the 8 chip result is delivered to multiplexor 596. (An alternate, not shown, is to have multiplexor 596 take the output of final adder stage 594 as an input and an additional select line to deliver is when SF=8). For spreading factors greater than 8, accumulation occurs in a similar fashion as described with respect to FIG. 3A. As before, there is a separate accumulation for both the I and the Q results for each active channel. Unless a symbol boundary has been reached, the new partial accumulation, calculated in adder 598, is stored in partial accum RAM 599 in a location corresponding to the active channel. Again, If a symbol boundary has been reached, meaning the number of chips designated by the spreading factor, SF, for the active channel, have been accumulated, then the I and Q accumulations correspond to the energy in the symbols and are delivered to the symbol rate processor. The partial accumulation values then stored in partial accum RAM 599 for the active channel will be reset to zero, under control of scheduler 510. Scheduler 510 maintains a spreading factor (SF) value for each channel and determines when the symbol boundary has been reached.

The previous paragraph has detailed one possible configuration supporting spreading factors smaller than the parallelism deployed. In general, for larger values of P and/or smaller values of SF, the appropriate taps can be added earlier in the adder tree to extract symbol data. Those earlier taps can be multiplexed in the fashion described to deliver the symbol data to the symbol rate processor.

The discussion of FIG. 3A above relating to PN generator 320, phase generator 330, and OVSF generator 340 applies to PN generator 520, phase generator 530, and OVSF generator 540, respectively, in FIG. 5. Naturally, scheduler 510 replaces scheduler 310 when making that translation.

The same principle of rotator location discussed in the contrast between FIGS. 3A and 3B applies to the embodiment depicted in FIG. 5. The details of the second option are not shown, but will be clear to those of skill in the art.

The flowchart of FIG. 4 is suitable to describe the functioning of scheduler 510 and its interrelationship with the various blocks of FIG. 5. Clearly the generalized parameters in FIG. 4 will now have numerical values inserted, i.e. CYCLES_PER_ROUND is 63, P=8, and S=8. Calculation of the parallel sum described in step 406 will encompass the additional tap values created by breaking a single adder tree into adder trees 590 and 592 and final adder stage 594 (the parallel sum value is the output of final adder 594). Symbol boundary output step 412 will encompass the multiplexing of the additional tap values for SF values less than P (i.e. SF=4 and P=8) for output to a symbol rate processor. Aside from these refinements, the processing flow for cycling through channels in the round, accumulation, updating pn_count$_{CH}$, and updating index$_{CH}$ (including time tracking) remains the same.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A finger front end for processing a plurality of channels, comprising:
    a shift register for receiving and shifting in samples, wherein a plurality of the samples are accessible for processing in parallel fashion;
    a parallel sum calculator for receiving a plurality of processed samples and producing a result;
    an accumulator for accumulating at least one result into a symbol, the symbol corresponding to a number of samples equal to a spreading factor; and
    a scheduler for controlling the shift register, the parallel sum calculator, and the accumulator such that they are time-shared to produce symbols for each of the plurality of channels.

2. A receiver having a finger front end for processing a plurality of channels comprising:
    a shift register for receiving and shifting in samples, wherein a plurality of the samples are accessible for processing in parallel fashion;

a parallel sum calculator for receiving a plurality of processed samples and producing a result;

an accumulator for accumulating at least one result into a symbol, the symbol corresponding to a number of samples equal to a spreading factor; and a scheduler for controlling the shift register, the parallel sum calculator, and the accumulator such that they are time-shared to produce symbols for each of the plurality of channels.

3. The receiver of claim 2, further comprising a digital signal processor for configuring each of the plurality of channels and receiving their corresponding outputs.

4. The receiver of claim 3, further comprising a searcher for determining channel parameters and providing them to the digital signal processor for configuration of each of the plurality of channels therewith.

5. An access terminal for use in a CDMA system including a receiver for processing a plurality of channels, comprising:

a shift register for receiving and shifting in samples, wherein a plurality of the samples are accessible for processing in parallel fashion;

a parallel sum calculator for receiving a plurality of processed samples and producing a result;

an accumulator for accumulating at least one result into a symbol, the symbol corresponding to a number of samples equal to a spreading factor; and a scheduler for controlling the shift register, the parallel sum calculator, and the accumulator such that they are time-shared to produce symbols for each of the plurality of channels.

6. An access point for use in a CDMA system including a receiver for processing a plurality of channels, comprising:

a shift register for receiving and shifting in samples, wherein a plurality of the samples are accessible for processing in parallel fashion;

a parallel sum calculator for receiving a plurality of processed samples and producing a result;

an accumulator for accumulating at least one result into a symbol, the symbol corresponding to a number of samples equal to a spreading factor; and a scheduler for controlling the shift register, the parallel sum calculator, and the accumulator such that they are time-shared to produce symbols for each of the plurality of channels.

7. A CDMA2000 system including a receiver for processing a plurality of channels comprising:

a shift register for receiving and shifting in samples, wherein a plurality of the samples are accessible for processing in parallel fashion;

a parallel sum calculator for receiving a plurality of processed samples and producing a result;

an accumulator for accumulating at least one result into a symbol, the symbol corresponding to a number of samples equal to a spreading factor; and a scheduler for controlling the shift register, the parallel sum calculator, and the accumulator such that they are time-shared to produce symbols for each of the plurality of channels.

8. A W-CDMA system including a receiver for processing a plurality of channels, comprising:

a shift register for receiving and shifting in samples, wherein a plurality of the samples are accessible for processing in parallel fashion;

a parallel sum calculator for receiving a plurality of processed samples and producing a result;

an accumulator for accumulating at least one result into a symbol, the symbol corresponding to a number of samples equal to a spreading factor; and a scheduler for controlling the shift register, the parallel sum calculator, and the accumulator such that they are time-shared to produce symbols for each of the plurality of channels.

9. An HDR system including a receiver for processing a plurality of channels, comprising:

a shift register for receiving and shifting in samples, wherein a plurality of the samples are accessible for processing in parallel fashion;

a parallel sum calculator for receiving a plurality of processed samples and producing a result;

an accumulator for accumulating at least one result into a symbol, the symbol corresponding to a number of samples equal to a spreading factor; and a scheduler for controlling the shift register, the parallel sum calculator, and the accumulator such that they are time-shared to produce symbols for each of the plurality of channels.

10. In a finger front end, a method of performing chip rate processing for a plurality of channels, comprising:

receiving samples as inputs to a shift register sized to hold a quantity of samples sufficient for a round;

accessing a plurality of samples spaced chip widths apart simultaneously from the shift register in accordance with an index address, the index address corresponding to samples associated with a channel;

performing a parallel sum calculation on the plurality of samples to produce a result, the accessing and parallel sum calculation being performed once per round for each of a plurality of channels;

accumulating at least one result into a symbol, the symbol corresponding to a number of samples equal to a spreading factor; and a scheduler for controlling the shift register, the parallel sum calculator, and the accumulator such that they are time-shared to produce symbols for each of the plurality of channels.

11. The method of claim 10, wherein the parallel sum calculation comprises:

generating a plurality of I and Q PN sequence values each cycle according to the channel;

despreading the plurality of samples with the plurality of I and Q PN sequence values to produce a plurality of despread I and Q results;

and summing the plurality of despread I and Q results to produce an I and Q result.

12. In a finger front end, a method of performing chip rate processing for a plurality of channels, comprising:

receiving I and Q samples as inputs to a shift register at a sampling rate, the shift register sized to hold a quantity of I and Q samples sufficient for a round;

accessing a plurality of I and Q samples spaced chip widths apart simultaneously from the shift register in accordance with an index address, the index address corresponding to the I and Q samples associated with a channel;

performing a parallel sum calculation on the plurality of I and Q samples to produce a partial I and Q result;

accumulating the partial I and Q result with one of a plurality of partial I and Q accumulation results associated with the channel;

and outputting the accumulated I and Q results on channel symbol boundaries corresponding to a spreading factor associated with the channel, the accessing, parallel sum, accumulation, and conditional outputting being performed once per round for each of a plurality of channels.

13. The method of claim 12, wherein the parallel sum calculation comprises:
generating a plurality of I and Q PN sequence values each cycle according to the channel;
despreading the plurality of I and Q samples with the plurality of I and Q PN sequence values to produce a plurality of despread I and Q results;
and summing the plurality of despread I and Q results to produce the partial I and Q result.

14. The method of claim 12, wherein the parallel sum calculation comprises:
generating a plurality of I and Q PN sequence values each cycle according to the channel;
despreading the plurality of I and Q samples with the plurality of I and Q PN sequence values to produce a plurality of despread I and Q results;
generating a plurality of covering sequence values each cycle according to the channel;
decovering the plurality of despread I and Q results with the plurality of covering sequence values to produce a plurality of decovered I and Q results;
and summing the plurality of decovered I and Q results to produce the partial I and Q result.

15. The method of claim 12, wherein the parallel sum calculation comprises:
generating a plurality of I and Q PN sequence values each cycle according to the channel;
despreading the plurality of I and Q samples with the plurality of I and Q PN sequence values to produce a plurality of despread I and Q results;
generating a plurality of phase values each cycle according to the channel;
rotating the plurality of despread results with the plurality of phase values to produce a plurality of rotated I and Q results; generating a plurality of covering sequence values each cycle according to the channel;
decovering the plurality of rotated I and Q results with the plurality of covering sequence values to produce a plurality of decovered I and Q results;
and summing the plurality of decovered I and Q results to produce the partial I and Q result.

16. The method of claim 12, wherein the parallel sum calculation comprises:
generating a plurality of I and Q PN sequence values each cycle according to the channel;
despreading the plurality of I and Q samples with the plurality of I and Q PN sequence values to produce a plurality of despread I and Q results;
generating a plurality of covering sequence values each cycle according to the channel;
decovering the plurality of despread results with the plurality of covering sequence values to produce a plurality of decovered I and Q results;
summing the plurality of decovered I and Q results to produce an I sum and a Q sum;
generating a phase value each cycle according to the channel;
and rotating the I sum and Q sum with the phase value to produce the partial I and Q result.

17. A finger front end for processing a plurality of channels, comprising:
a shift register for receiving and shifting in I and Q samples, wherein a plurality of the I and Q samples are accessible in parallel fashion in accordance with an index address;
a parallel sum calculator for receiving the plurality of I and Q samples according to the index address and producing an I and Q result; a scheduler for generating control of the shift register and the parallel sum calculator such that they are time-shared to produce results in sequence for each of the plurality of channels, wherein the control comprises:
an active channel value for indicating which of the plurality of channels corresponds to the output of the parallel sum calculator; and an index address for accessing the shift register in accordance with the active channel.

18. The finger front end of claim 17, wherein the parallel sum calculator comprises:
a PN generator for generating a plurality of I and Q PN sequence values each cycle according to the active channel;
a plurality of despreaders for despreading the plurality of I and Q samples with the plurality of I and Q PN sequence values to produce a plurality of despread I and Q results;
and a summer for summing the plurality of despread I and Q results to produce the I and Q result.

19. The finger front end of claim 18, wherein the parallel sum calculator further comprises a plurality of rotators for rotating the despread I and Q results according to one or more phase values associated with the active channel and delivering a plurality of rotated I and Q results to the summer for summing to produce the I and Q result.

20. The finger front end of claim 18, wherein the parallel sum calculator further comprises:
a covering sequence generator for producing a plurality of covering sequence values according to the active channel;
and a plurality of decoverers for decovering the despread I and Q results with the plurality of covering sequence values and and delivering a plurality of decovered I and Q results to the summer for summing to produce the I and Q result.

21. The finger front end of claim 19, wherein the parallel sum calculator further comprises:
a covering sequence generator for producing a plurality of covering sequence values according to the active channel; and a plurality of decoverers for decovering the despread I and Q results with the plurality of covering sequence values and delivering a plurality of decovered I and Q results to the plurality of rotators to produce the plurality of rotated I and Q results.

22. The finger front end of claim 20, wherein the parallel sum calculator further comprises a rotator for rotating the output of the summer with a phase value in accordance with the active channel to produce the I and Q result.

23. The finger front end of claim 17, further comprising an accumulator for accumulating the I and Q result in a partial accumulation for each active channel and conditionally outputting the partial accumulation on symbol boundaries in accordance with the spreading factor associated with the active channel.

24. A finger front end for processing a plurality of channels, parameterized by:
P, a parallelism factor;
S, a sampling rate; MAX_CHANNELS, the maximum number of channels supported in the plurality of channels, determined by (P*S)−2; CYCLES_PER_ROUND, the number of cycles in a round, determined by MAX_CHANNELS+1;
and SHIFTER_LEN, the minimum shift register length, determined by CYCLES_PER_ROUND+(P−1)*S;
comprising: a shift register of length SHIFTER_LEN for receiving and shifting in I and Q samples at sampling rate S, and wherein a plurality P of the I and Q samples are accessible in parallel fashion in accordance with an index address;
a parallel sum calculator for receiving the P I and Q samples according to the index address and producing an I and Q result;
a scheduler for generating control of the shift register and the parallel sum calculator such that they are time-shared to produce results in sequence for each of the MAX_CHANNELS once per round and wherein the control comprises:
an active channel value for indicating which of the plurality of channels corresponds to the output of the parallel sum calculator;
and an index address for accessing the shift register in accordance with the active channel.

25. The finger front end of claim 24, further comprising an accumulator for accumulating the I and Q result in a partial accumulation for each active channel and conditionally outputting the partial accumulation on symbol boundaries in accordance with the spreading factor associated with the active channel, under control of the scheduler.

26. The finger front end of claim 25, wherein the parallel sum calculator produces, in addition to the I and Q result, partial sums corresponding to spreading factors less than P, and further comprising a selector for selectively outputting the partial accumulation or the partial sums in accordance with the spreading factor associated with the active channel, under control of the scheduler.

27. In a finger front end parameterized by:
P, a parallelism factor; S, a sampling rate;
MAX_CHANNELS, the maximum number of channels supported in a plurality of channels, determined by (P*S)−2;
and CYCLES_PER_ROUND, the number of cycles in a round, determined by MAX_CHANNELS+1, a method for producing an index associated with each channel, index.sub.CH, for accessing a parallel access shift register, comprising:
in each round of CYCLES_PER_ROUND: remain idle for one cycle, refrain from accessing the shift register or ignore the results of such access;
and sequence through each channel, one channel per cycle, adjusting each channel's associated index, wherein the index adjustment comprises the following steps: when the index associated with a channel is less than zero: increment the index by CYCLES_PER_ROUND; refrain from accessing the shift register or ignore the results of such access;
and remain idle for the duration of the cycle; otherwise: access the shift register utilizing the index;
when a retard command is in effect, decrement the index by 2;
when an advance command is in effect, take no action; when neither an advance nor retard command is in effect, decrement the index by 1;
regardless of whether an advance or retard command is in effect, increment the index by CYCLES_PER_ROUND−((P*S)−1).

28. The method of claim 27, further comprising:
incrementing a PN count value, associated with each channel, by P for each cycle in which the associated index is not less than zero;
and signaling the accumulator to output the partial accumulation on symbol boundaries determined by the spreading factor and PN count value associated with the channel.

29. The method of claim 27, further comprising: incrementing a PN count value, associated with each channel, by P for each cycle in which the index associated with the channel is not less than zero;
when the spreading factor associated with the channel is P or greater, signaling the accumulator to output the partial accumulation on symbol boundaries determined by the spreading factor and PN count value associated with the channel;
and when the spreading factor associated with the channel is less than P, selecting the partial sums in accordance with the spreading factor.

30. The finger front end of claim 1, each of the samples being an I and Q sample.

31. The finger front end of claim 1, the plurality of processed samples being the plurality of samples accessed for processing in parallel fashion.

32. The finger front end of claim 1, further comprising a sample processor for generating the plurality of processed samples from the plurality of samples accessed in parallel fashion, the sample processor comprising a despreader for despreading the accessed samples using a segment of a spreading code.

33. The finger front end of claim 32, the sample processor further comprising a rotator for rotating the despread samples in frequency.

34. The finger front end of claim 33, the sample processor further comprising a decover for decovering the rotated samples using a segment of an OVSF code.

35. The finger front end of claim 1, further comprising a selection unit for selecting a symbol from the output of the accumulator or the output of the parallel sum calculator, the selection unit selecting the output of the accumulator when the spreading factor is greater than the number of samples accessible for processing in parallel fashion.

36. The receiver of claim 2, each of the samples being an I and Q sample.

37. The receiver of claim 2, the plurality of processed samples being the plurality of samples accessed for processing in parallel fashion.

38. The receiver of claim 2, further comprising a sample processor for generating the plurality of processed samples from the plurality of samples accessed in parallel fashion, the sample processor comprising a despreader for despreading the accessed samples using a segment of a spreading code.

39. The receiver of claim 38, the sample processor further comprising a rotator for rotating the despread samples in frequency.

40. The receiver of claim 39, the sample processor further comprising a decover for decovering the rotated samples using a segment of an OVSF code.

41. The receiver of claim 2, further comprising a selection unit for selecting a symbol from the output of the accumulator or the output of the parallel sum calculator, the selection unit selecting the output of the accumulator when the spreading factor is greater than the number of samples accessible for processing in parallel fashion.

* * * * *